United States Patent [19]

Rivers

[11] 4,277,219
[45] Jul. 7, 1981

[54] FRONT LOADING, SIDE UNLOADING DUMPER

[76] Inventor: Charles F. Rivers, 15318 Warwick, Detroit, Mich. 48223

[21] Appl. No.: 933,713

[22] Filed: Aug. 15, 1978

[51] Int. Cl.³ .............................................. B65G 65/34
[52] U.S. Cl. ..................................... 414/421; 414/415
[58] Field of Search ............... 414/421, 419, 422, 425, 414/415, 420, 423, 648, 639–642, 650, 778, 782, 777, 764–766

[56] References Cited

U.S. PATENT DOCUMENTS

| 2,342,014 | 2/1944 | Schanstra | 414/421 X |
| 2,627,109 | 2/1953 | Bock et al. | 414/782 X |
| 2,905,344 | 9/1959 | Hostetler et al. | 414/421 |
| 3,884,376 | 5/1975 | Rivers | 414/421 |
| 4,090,626 | 5/1978 | Ebeling et al. | 414/420 X |

FOREIGN PATENT DOCUMENTS 1456736  1/1969  Fed. Rep. of Germany ........... 414/421

Primary Examiner—Stephen G. Kunin
Assistant Examiner—Edmond G. Rishell, Jr.
Attorney, Agent, or Firm—Whittemore, Hulbert & Belknap

[57] ABSTRACT

A dumper for parts of various sizes comprising a cradle mounted on a fixed pivot for movement from a loading position through an angle approaching 180° to an unloading position. The pivot axis is such that the cradle, which loads in the front, dumps to the side. The drive for the cradle includes movable chains. The ends of the chains extend part way around and are affixed to sprockets rigidly secured to the cradle.

4 Claims, 5 Drawing Figures

FRONT LOADING, SIDE UNLOADING DUMPER

BACKGROUND AND SUMMARY OF THE INVENTION

The dumper of this invention loads in the front and dumps to the side, that is, 90° from the point of loading. The dumper has a cradle adapted to receive a container loaded with various types of parts. The cradle can rotate through an angle approaching 180° to insure that all of the parts are discharged. This is accomplished by fastening the cradle to moving chains to drive the cradle in both directions under power.

The method of fastening the chains to the cradle is preferably by welding sprockets to the cradle and fastening the chain ends around the sprockets so that no movement between the chain ends and sprockets occurs. Chain and sprocket wear is thereby eliminated and maintenance is reduced.

The cradle is mounted on a stationary pivot to simplify construction and reduce cost.

Other dumpers have been built in the past which have a movable pivot for the cradle, do not dump 90° from the loading point and require frequent maintenance due to wear at the points where the lifting chains are connected to the cradle. In these previously built dumpers, a track which is not a true segment of a circle must be used with a roller to move the pivot back and forth. The roller is subject to rapid wear due to the heavy loads, resulting in costly repair and loss of operating time. There is also relative motion where the lifting chains are connected to the cradle. This motion is due to the contour of the track and results in rapid wear. These previously built dumpers employed rack and pinion arrangements for the movable pivot but such arrangements are subject to fouling due to falling material even with the best of guarding.

All of the above problems are eliminated by my new design. The pivot is fixed eliminating the rack and pinion. The ends of the lifting chains are fastened to stationary sprockets on the cradle so that there is no movement between the chain ends and the sprockets, thus eliminating wear. The sprockets clear and hence do not rub on the chain guides.

Other objects and features of the invention will become more apparent as the description proceeds, especially when taken in conjunction with the accompanying drawings.

DETAILED DESCRIPTION

Figure 1:
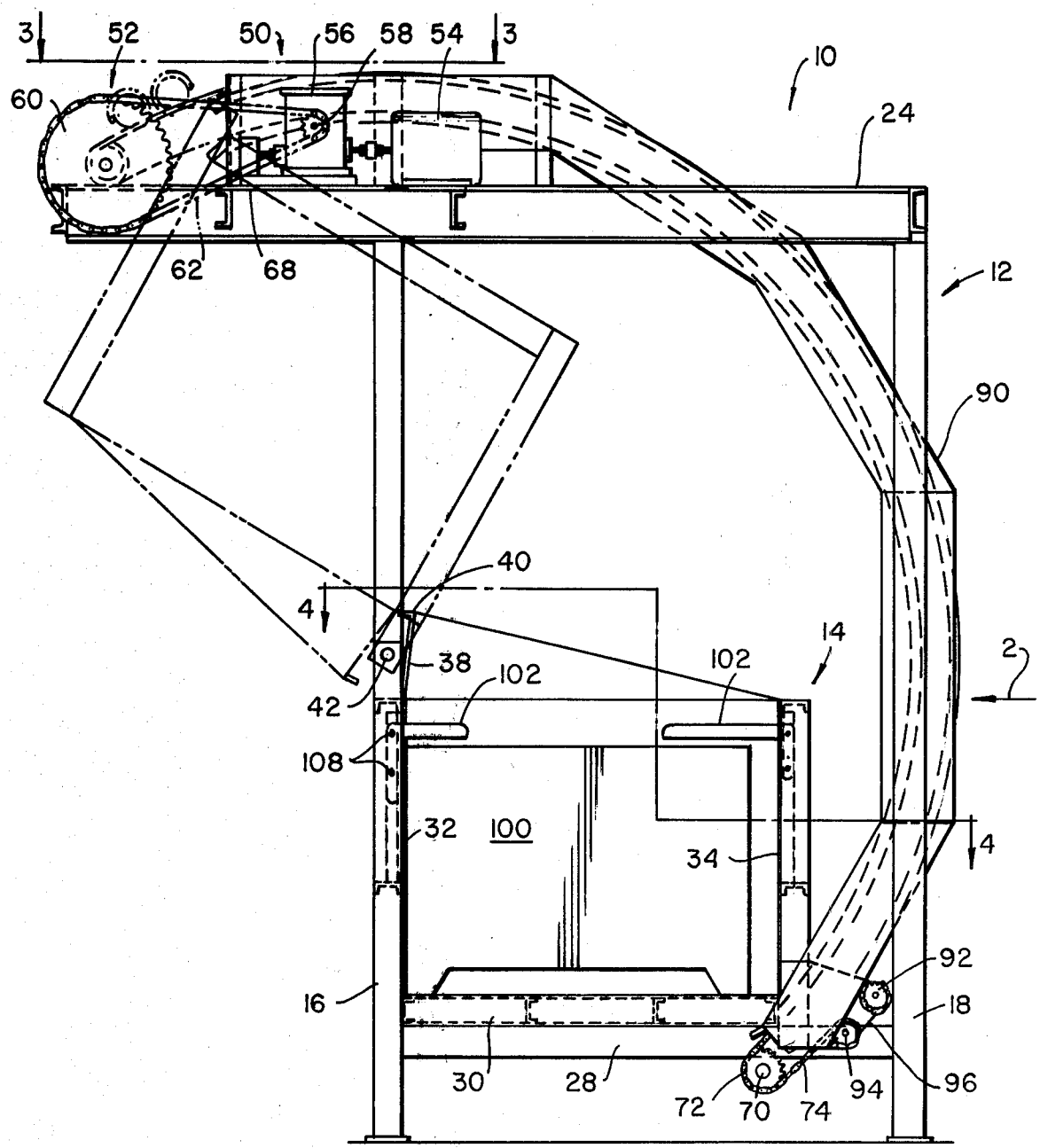
FIG. 1 is a side elevational view of a dumper constructed in accordance with my invention.
Figure 2:
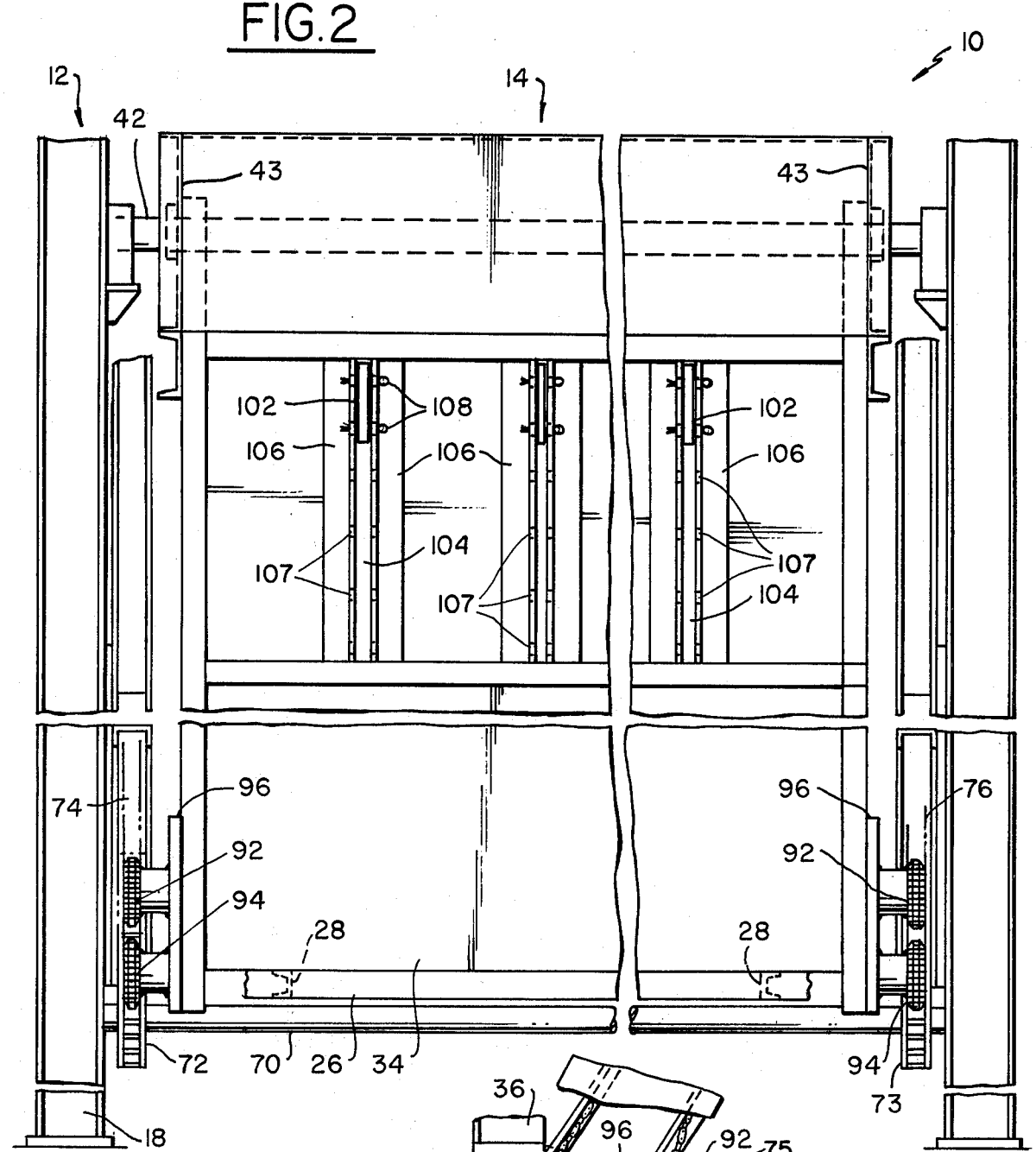
FIG. 2 is an enlarged side elevation of the dumper as viewed in the direction of the arrow 2 in FIG. 1.

Referring now more particularly to the drawings, the dumper generally designated 10, comprises an upright frame 12 and a cradle 14.

The frame 12 may be of any suitable construction and in the present instance is composed of laterally spaced front uprights 16 and 18 and laterally spaced rear uprights 20 and 22. These uprights are connected together by horizontal top cross frame members 24 and horizontal bottom cross frame members 26 and 28. The parts of the frame are thus joined together to form a rigid supporting structure. The front of the frame 12 between the uprights 16 and 18 is open between the top and bottom cross frame members to permit the cradle to be loaded from the front.

The cradle 14 in the present instance is of generally rectangular form having a bottom plate 30, upright side plates 32 and 34 and an upright rear plate or wall 36. The cradle is open at the front and at the top. The side plate or wall 32 has an upwardly inclined portion 38 at the top providing a discharge lip 40 at the upper edge over which the parts are discharged during unloading.

The cradle 14 is pivoted to the supporting frame 12 by a horizontal pivot shaft 42 for swinging movement from the lower position shown in solid lines in FIG. 1 in which the bottom plate 30 of the cradle is supported in substantially horizontal position on the frame members 28, to the unloading position shown in dot-dash lines in which the cradle has been turned through an angle approaching 180° and in which unloading position parts are discharged over the lip 40 into any receptacle provided for that purpose. When moved from loading to unloading position, the cradle moves over-center, that is its center of gravity moves from one side of the pivot shaft 42 to the other. The pivot shaft 42 extends in a front to rear direction and is terminally secured to the uprights 16 and 22 of the frame. The upper extensions 43 of the side wall 32 of the cradle along the front and rear edges thereof are pivotally mounted on the shaft 42. Accordingly, the axis of the shaft 42 extends along a line adjacent to the upper edge of the side wall 32.

A power drive unit 50 and transmission 52 are provided to swing the cradle between loading and unloading positions. The drive unit includes a motor 54 which drives a speed reducer 56. A small sprocket 58 on the speed reducer drives a large sprocket 60 by means of a link chain 62. The large sprocket is secured to a transmission shaft 64 to which there are secured laterally spaced transmission sprockets 66 and 67. The motor 54, speed reducer 56 and shaft 64 are mounted on a frame extension 68. The transmission includes in addition to the shaft 64 and sprockets 66 and 67, the shaft 70 and laterally spaced sprockets 72 and 73. Sprockets 72 and 73 are fixed upon shaft 70 and shaft 70 is mounted for rotation on the bottom cross frame members 28.

A flexible link chain 74 extends over sprockets 66 and 72. A flexible link chain 76 extends over sprockets 67 and 73. These link chains 74 and 76 are guided from the sprockets on one shaft 64 to those on the other shaft 70 so that both inner and outer reaches of each chain lie on an arc of a circle centered on the axis of shaft 42 which is the axis of swinging movement of the cradle. The guide for the inner and outer reaches of the chain 74 are the arcuate channels 80 and 82 which open radially outwardly and are formed as arcs of circles centered on the axis of shaft 42. The guides for the inner and outer reaches of the chain 76 are channels 84 and 86 which open radially outwardly and likewise are formed as arcs of circles centered on the axis of shaft 42. These channel guides 80–86 are mounted upon the elongated support members 90 which are made of straight segments formed to follow the general curve of the chains and are fixedly secured to the frame 12 of the dumper.

Figure 5:
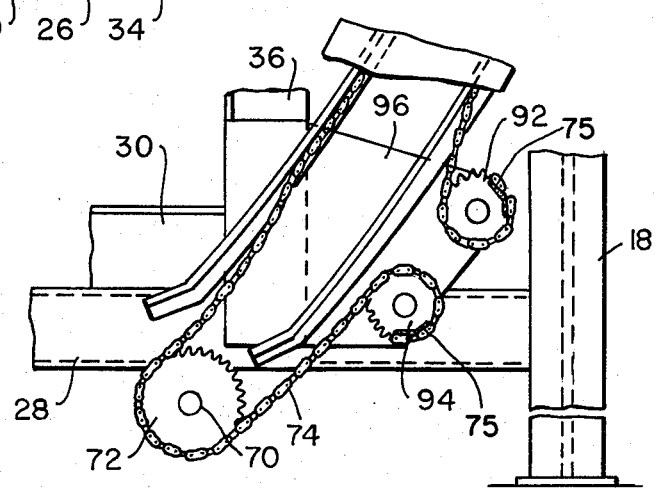
FIG. 5 is an enlarged fragmentary view of a portion of FIG. 1.
Figure 3:
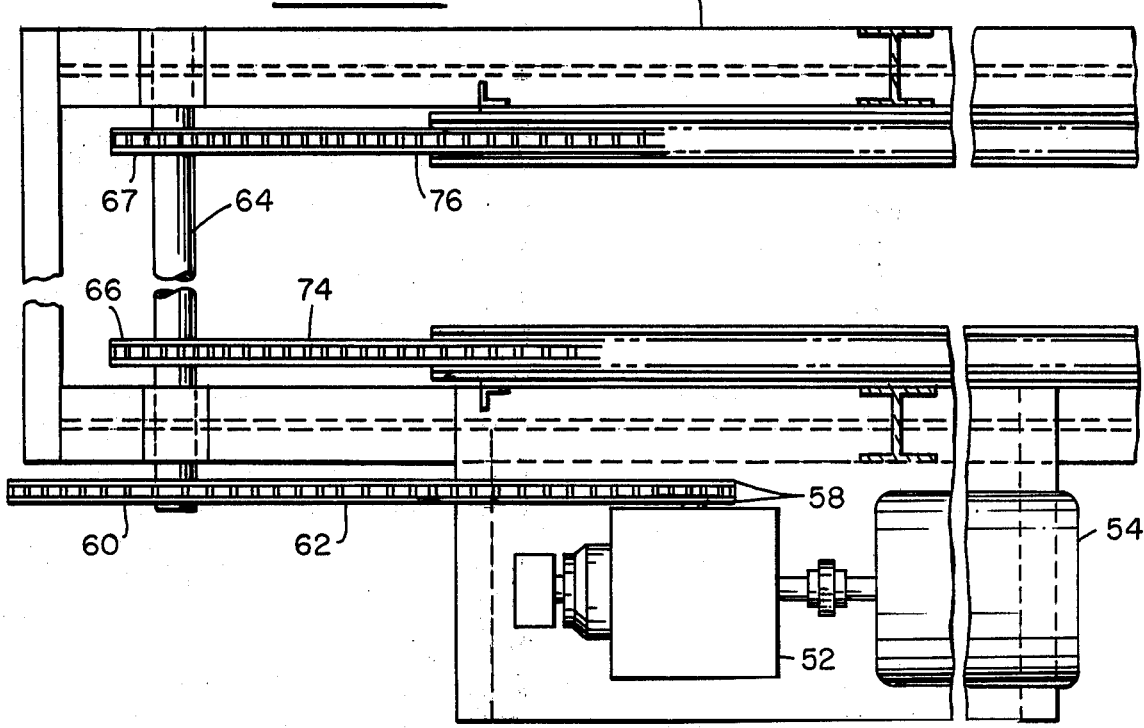
FIG. 3 is an enlarged fragmentary view taken on the line 3—3 in FIG. 1.
Figure 4:
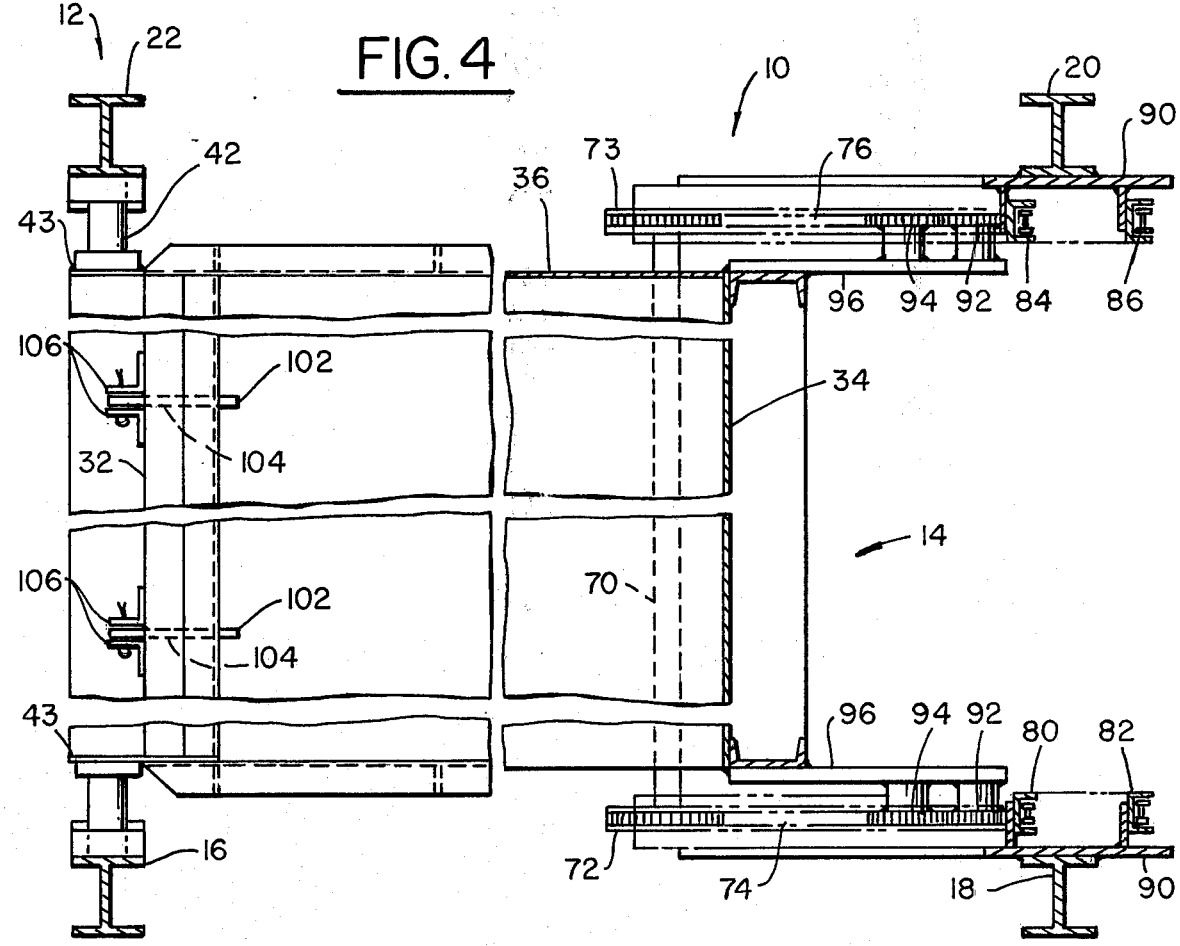
FIG. 4 is an enlarged sectional view taken on the line 4—4 in FIG. 1.

The ends of each link chain 74,76 are connected to the lower edge of the swinging side of the cradle by means of sprockets 92 and 94 welded or otherwise permanently secured to a bracket 96 secured to the cradle. As seen in FIGS. 1 and 5, each end of the link chain 74 is wrapped part way around a sprocket and is permanently secured thereto as by welding 75 or other suitable means. Obviously no movement occurs between the chain and the sprocket. The other chain 76 has its ends wrapped part way around and welded or otherwise permanently secured to sprockets affixed to a bracket 96 at the lower rear corner of the cradle in the same manner as the ends of the chain 74 shown in FIGS. 1 and 5.

It will be apparent that when the motor 54 is driven in one direction, the cradle may be raised from the loading position shown in solid lines in FIG. 1 to the unloading position shown in dot-dash lines. The cradle may be driven in the opposite direction back to its loading position by reversing the motor.

The cradle is intended for use with a suitable container adapted to hold the parts to be handled by the dumper. The container may be any suitable skid box, wire crate or the like. In the present instance, the skid box 100 is a simple rectangular container having a bottom and four upright sides of a width and length capable of fitting in the cradle and being supported upon the bottom plate 30 of the cradle against its rear wall 36. As noted above, the front of the cradle and the front of the frame are open to allow the skid box to be placed in the cradle and removed from the front.

The skid box is held down in the cradle to prevent it from dropping out of the cradle during unloading. For this purpose, the angularly shaped hold-down dogs or stops 102 are provided with means for vertically adjustably mounting the dogs to accommodate skid boxes of differing heights. As seen, each of the side plates 32 and 34 of the cradle has slots 104 of sufficient width to receive the dogs. Pairs of vertical angle irons or ribs 106 are secured to the outer sides of the cradle along the opposite side of each slot. Each pair of ribs 106 is formed with a series of transversely aligned holes 107 which are spaced apart vertically the same distance as the spacing between corresponding holes in one leg of each dog. Hence a dog may be secured in vertically adjusted position in a slot by a cotter pin or the like 108 extending through the aligned holes in the ribs and one leg of the dog and with the other leg of the dog projecting into the cradle over the rim of the box to hold it down.

In use, and with the cradle 14 in the solid line position of FIG. 1, the skid box 100 loaded with parts is placed inside the cradle through the open front. The hold-down dogs 102 are adjusted depending upon the height of the skid box to extend over the rim of the box and hold it down during dumping. If desired, the dogs may be adjusted a slight distance above the rim of the skid box so that when the cradle is turned to the dot-dash line position in FIG. 1, the skid box will drop against the stops and jar all of the parts loose for discharge.

It will be seen that this dumper which loads in the front discharges the contents of the skid box to the side as shown in FIG. 1.

What I claim as my invention is:

1. A dumper comprising a support frame, a cradle, generally horizontal pivot means mounting said cradle on said frame for movement from a loading position to an unloading position, drive means for moving said cradle from said loading position to said unloading position, said drive means comprising a flexible chain, and means connecting the ends of said chain to said cradle comprising a pair of sprockets being rigidly secured to said cradle and each having teeth around its periphery, the axis of each of said pair of sprockets being parallel to the axis of said pivot means, one end portion of said chain being engaged with the teeth at least part way around one of said pair of sprockets and rigidly secured thereto, the other end portion of said chain being engaged with the teeth at least part way around the other of said pair of sprockets and rigidly secured thereto.

2. A dumper as defined in claim 1, wherein said cradle has an access opening in the front for loading and the axis of said pivot means extends in a direction from front to rear of said cradle so that said cradle loads in the front and dumps to the side.

3. A dumper as defined in claim 1, wherein said flexible chain extends around arcuately spaced sprocket members, and arcuate guide means are provided between said sprocket members for said chain.

4. A dumper as defined in claim 1, wherein said cradle has a load-supporting bottom and a side extending upwardly from one side edge of said bottom, said cradle having an access opening in the front for loading, said frame being open in front of said cradle to permit such loading thereof, and the axis of said pivot means extending in a direction from front to rear of said cradle, whereby said cradle loads in the front and dumps to the side 90° from the point of loading.

* * * * *